Patented Oct. 20, 1953

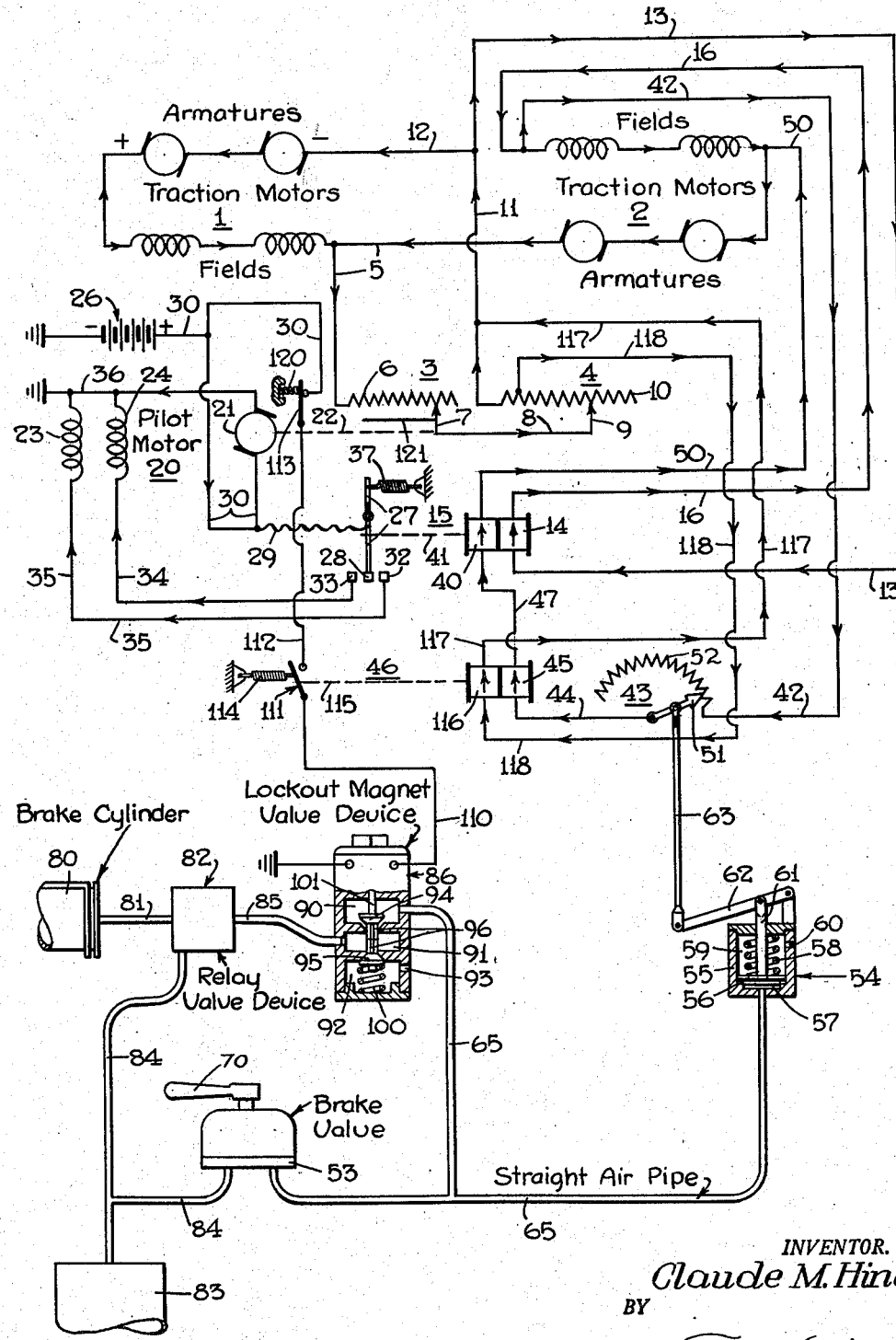

2,656,222

UNITED STATES PATENT OFFICE 2,656,222

COMBINED PNEUMATIC AND DYNAMIC BRAKE APPARATUS

Claude M. Hines, Verona, Pa., assignor to Westinghouse Air Brake Company, a corporation of Pennsylvania Application March 26, 1951, Serial No. 217,603

4 Claims. (Cl. 303—3)

This invention relates to combined pneumatic and dynamic brake apparatus and more particularly to means comprised in such apparatus for automatically effecting operation of the pneumatic brake in response to fade out of the dynamic brake.

In the copending application of S. L. Williams et al., Serial No. 47,046, filed August 31, 1948, now Patent No. 2,591,224, issued April 1, 1952, and assigned to the assignee of the present application, there is disclosed a combined pneumatic and dynamic brake apparatus embodying a lock-out magnet valve means energized from the voltage drop across a resistor in the dynamic brake circuit to control cut-in and cut-out of the pneumatic brake according to amount of dynamic braking current generated, hence to degree of dynamic braking effort.

Such a combined brake apparatus has two disadvantages. First, in order to protect against simultaneous grossly excessive application of both the pneumatic brake and the dynamic brake, it was necessary to have the lockout magnet remain energized to hold off the pneumatic brake until the dynamic brake current fell off to a relatively low value, corresponding to such as a train speed of 10 miles per hour for example; sacrificing effective protection against loss of dynamic braking at the higher train speeds, since the dynamic braking current at the higher speeds would need fall off nearly 100% before the lockout magnet valve means would respond to cut-in the pneumatic brake. Second, during coasting and at the time of initiating a dynamic brake application, until generation of dynamic brake current sufficient to energize the lockout magnet valve device, the pneumatic brake would apply along with the dynamic brake; resulting in erratic braking of the train as the pneumatic brake was cut-out by energization of the magnet valve device.

In view of the foregoing, it is one object of the invention to provide a combined pneumatic and dynamic brake apparatus comprising means which will respond automatically to cut-in the pneumatic brake upon a certain substantially constant proportionate loss of any degree of dynamic braking called for by conditions established as desired by an operator.

Also, in view of the foregoing, it is another object of the invention to provide a combined pneumatic and dynamic brake apparatus comprising means which will respond automatically to cut-out the pneumatic brake during coasting and at time of initiating a dynamic brake application to assure smooth braking on the train.

Other objects and advantages of the invention will become apparent from the following more detailed description taken in connection with the accompanying drawing in which:

The single figure is a schematic representation partly in outline and partly in section of a combined dynamic and pneumatic brake apparatus embodying the invention.

Description of dynamic braking control

Referring to the drawing, the combined pneumatic and dynamic brake apparatus embodying the invention comprises, for sake of illustration, two pairs of traction motors, 1 and 2, as usually are employed on an electrically propelled vehicle such as a subway car, for example; one pair of motors being connected to driving axles (not shown) at one end of the car, and the other pair of motors being connected to driving axles at the opposite end of the car. Such traction motors, in the well-known manner, when supplied with electrical energy, act to propel the car, and when deprived of such electrical energy and properly controlled, the same motors act as electric generators for dynamic braking of the car. Only the latter application of the traction motors is of concern to this invention, and any of the equipment concerned with control of such motors when operating as prime movers or with conditioning said motors to act as generators has not been included herein.

Insofar as the two pairs of traction motors are employed for dynamic braking, each pair of motors comprises respective series armatures and series fields in turn in series with the armatures. Both pairs of motors act as generators for dynamic braking and are connected in parallel with each other in an electrical circuit which includes two series rheostats 3 and 4 for varying resistance to current flowing through the traction motor fields, thereby controlling the dynamic braking effort of the motors acting as generators, in the well-known manner.

With a particular polarity of the motors 1 acting as generators, current generated by these motors will flow in a direction indicated by the arrows shown in the drawing via a wire 5 into and through coils 6 and an adjustable coil contact arm 7 of the rheostat 3, thence through an electrical conductor 8 to an adjustable coil contact arm 9 and coils 10 of the rheostat 4 to return to the motors 1 via wires 11 and 12.

With a corresponding polarity of the motors 2 when acting as generators, current generated by these motors will flow in a direction indicated by the arrows shown in the drawing into a branch of the wire 5 to flow with the current generated by motors 1 through the rheostats 3 and 4 to the wire 11 where flow of current divides into a return flow to the motors 1 via wire 12 and return flow to the motors 2 via a wire 13, a magnet coil 14 of a two coil limit relay device 15 (for reasons which will become obvious from subsequent description), and a wire 16.

The two contact arms 7 and 9 of the rheostats 3 and 4 are connected through mechanical linkage (not shown) for movement in unison relative to the respective coils 6 and 10 to vary the amount of resistance in the dynamic braking circuits to regulate the current through the fields of the traction motors acting as generators and thereby control the torque required to turn their armatures, hence control the degree of dynamic braking at any given speed.

Apparatus for controlling dynamic braking operation of the traction motors 1 and 2 comprises a reversible pilot motor 20 having the usual armature 21 with an operative connection, indicated by a dotted line 22, for actuating in unison the two contact arms 7 and 9 of rheostats 3 and 4. The pilot motor armature 21 will rotate in one direction or its opposite in response to selective excitation of two shunt fields 23 or 24 for actuating rheostat arms 7 and 9 to increase and decrease, respectively, resistance in the traction motor circuits to call for decrease and increase, respectively, in dynamic braking current through the traction motor fields to control dynamic braking force applied to the wheels of the vehicle.

For sake of illustration a battery 26 may be employed to act as a source of electrical energy for operating the pilot motor 20; the negative terminal being connected to ground. For controlling operation of the pilot motor 20, the two coil limit relay 15 is employed. The relay 15 comprises a movable contact arm 27 carrying a contact 28 having an electrical connection with one pole of the battery 26 and one terminal of the pilot motor armature by way of a conducting portion of the arm 27, a flexible wire 29 and branches of a wire 30. The contact 28 is disposed between two fixed contacts 32 and 33 which are connected electrically to the opposite pole of the battery 26 and opposite terminal of the motor armature 21 via a ground wire 36 and pilot motor fields 23 and 24, respectively, connected to the fixed contacts via wires 34 and 35, respectively. A bias spring 37 is suitably connected to contact arm 27 to urge movable contact 28 into engagement with fixed contact 33 to complete electrical circuit between battery 26, the pilot motor armature and field 24 to cause movement of the rheostat arms 7, 9 in a direction to reduce resistance in the traction motor dynamic braking circuits, as aforedescribed. Action of the bias spring 37 on the contact arm 27 is opposed by additive magnet force generated by flow of current through the two coils of the limit relay 15; coil 14 aforementioned and a second coil 40. Operative connection between the coils 14, 40 and the contact arm 27 is indicated by a dash line 41 in the drawing.

One terminal of the coil 40 of relay 15 is connected electrically to one end of the fields of the traction motors 2 at junction with wire 16 by way of a wire 42, a rheostat 43, a wire 44, a coil 45 of a two coil lockout relay 46 (to be described in detail hereinafter), and a wire 47. The opposite terminal of the coil 40 of relay 15 is connected electrically to the opposite end of the fields of the traction motors 2 by way of a wire 50.

The rheostat 43 comprises the usual contact arm 51 connected electrically to the wire 44 and the usual resistance coils 52 connected electrically at its one end to the wire 42. The rheostat is arranged to be adjusted according to dictates of the usual operator's brake valve device 53 in the pneumatic portion of the apparatus by means of a fluid pressure actuator 54.

The actuator 54, for sake of illustration, may comprise a casing 55 having a piston 56 slidably disposed therein which is subject opposingly to pressure of fluid in a pressure chamber 57 on one side and to force of a compression spring 58 disposed in a spring chamber 59 on its opposite side; the latter chamber being constantly open to atmosphere via a port 60 in the casing. The piston 56 is attached to one end of a piston rod 61 which extends outwardly through the casing into operative connection with the contact arm 51 of rheostat 43 by means of a lever 62 and connecting link 63. The pressure chamber 57 in actuator 54 is connected to the usual straight air pipe 65 of the pneumatic brake portion of the apparatus. The actuator 54 is so arranged relative to the rheostat 43 that variation in straight air pipe pressure between established maximum and minimum values will effect a corresponding variation in amount of resistance the rheostat 43 presents to the electrical circuit through the coil 40 of the limit relay 15 and coil 45 of the lockout relay 46 between maximum and minimum values, respectively.

In the manner well-known to the pneumatic brake art employing the usual electro-pneumatic straight air system, variations in pressure in the straight air pipe 65 are affected by positioning of the brake valve handle 70 to control the degree of pneumatic brake application as well as the dynamic brake application.

*Operation of dynamic braking control*

In operation of apparatus for controlling dynamic braking assume that the traction motors 1, 2 are connected electrically as shown in the drawing to act as generators for dynamic braking of a vehicle; that such vehicle is travelling at a rate of speed sufficiently great to be capable of effecting any degree of dynamic braking within the operating range; that the brake valve handle 70 is positioned to call for release or zero braking and that therefore the straight air pipe 65 is at a minimum pressure, such as atmospheric pressure, for example, and is vented via the brake valve 53; and that the contact arms 7 and 9 of the rheostat 3 and 4 are positioned to call for a certain coasting rate of dynamic braking current to be developed through rotation of the armatures of traction motors 1, 2 by virtue of excitation of the fields of these motors by such current.

With the straight air pipe 65 vented as assumed, the pressure chamber 57 in the actuator 54 will be void of fluid under pressure, so that the piston 56 therein will be solely under the influence of the compression spring 58 and therefore will assume the position in which it is shown in the drawing, holding the rheostat 43 positioned to call for a minimum or zero resistance in the electrical circuit through the coil 40 of the limit relay 15.

A portion of the dynamic braking current generated at the minimum or coasting rate will flow via wires 13 and 16 through the coil 14 of the limit relay 15 while another portion of the same current will flow through the coil 40 of the same relay via wire 42, the minimum amount of resistance in rheostat 43, and wires 47, 50. At this time, the coasting rate of current flowing through the two coils 14 and 40 of the relay 15 will, by virtue of design and arrangement of these coils to summarize their magnet efforts, develop sufficient magnet force as will balance action of the spring 37 to hold the movable contact 28 in a position intermediate fixed contacts 32 and 33 so that the pilot motor 20 will not be in operation, with the brake controlling rheostats 3 and 4 in respective properly adjusted positions as assumed.

Assume now that it is desired to effect a dynamic brake application in any desired degree. The operator will move the brake handle 70 to a position in accord with the degree of dynamic brake application desired, thereby effecting pressurization of the straight air pipe 65, hence chamber 57 in actuator 54, a corresponding degree. The piston 56 in actuator 54 will respond to increase in pressure of fluid in chamber 57 to position the contact arm 51 of rheostat 43 to call for an increase in resistance in the electrical circuit through coil 40 of relay 15 corresponding to the degree of such pressure increase. The dynamic brake current flowing through the coil 40 of relay 15 thus will be reduced, while the dynamic brake current flowing through the coil 14 of the same relay will remain the same, resulting in a loss in total magnetic effort of the two coils to oppose action of spring 37. The spring 37 will respond to such reduction in magnet effort of the two coils to move contact 28 into engagement with fixed contact 33 to call for operation of the pilot motor 20 in a direction calling for movement of the contact arms 7 and 9 for reducing the resistance which the rheostats 3 and 4 present to the dynamic braking circuit, thereby allowing more current to flow through the fields of the traction motors to increase the amount of dynamic braking experienced by the vehicle wheels driving the motor armatures. Such increase in dynamic braking current will result in a corresponding increase in current flowing through the coils 40 and 14 of the relay 15 until the effect of their resultant additive magnet forces acting on the contact arm 27 balance with the effect of the spring 37 acting on the same arm, at which time the arm again assumes a neutral position in which the contact 28 is disposed intermediate the contacts 32 and 33 to terminate operation of the pilot motor 20 and further adjustment of the rheostats 3 and 4.

If a decrease in degree of dynamic braking is desired by the operator, he will move the brake valve handle 70 in a direction calling for a decrease in pressure in the straight air pipe 65 in degree as desired, with consequent adjustment of the rheostat 43 to reduce the amount of resistance in the circuit through the coil 40 of relay 15 in amount corresponding to the reduced pressure in the straight air pipe 65. Such reduction in resistance imposed by the rheostat 43 will result in an increase in current flowing through the coil 40 of the relay 15, while current through coil 14 remains the same, with a corresponding increase in the magnetic effort of the two relay coils. Such increase in magnetic effort of coils 14, 40 will overcome action of the spring 37 to bring contact 28 into engagement with contact 32 for operating the pilot motor 20 to adjust rheostats 3 and 4 for increasing the resistance in the dynamic braking circuit, thereby decreasing the dynamic braking current, hence current through the fields of the motors 1 and 2, and thus reducing the amount of dynamic braking experienced by the vehicle wheels driving the armatures of these motors. Such reduction in dynamic braking current continues with continued adjustment in position of the rheostats 3 and 4 until the resultant reduction in current flowing through the two coils of the relay 15 so reduces their total magnetic effort as will allow the spring 37 to return the contact arm 27 to its neutral position, thus terminating operation of the pilot motor 20 and further adjustment of the rheostats 3 and 4 with the desired reduction of dynamic braking current thus realized.

The aforedescribed apparatus for controlling dynamic braking will automatically respond to effect adjustment of the rheostats 3 and 4 in effort to maintain a constant degree of dynamic brake application as the traction motor armatures decelerate under influence of dynamic braking on the vehicle, for example. Such reduction in rotational speed of the traction motor armatures, resulting in a decrease in generated dynamic brake current, causes a corresponding decrease in current flowing through the coils in relay 15, with consequent reduction of magnetic effort and preponderance in effort of spring 37 on contact arm 27 to cause engagement of contacts 28 and 33 for operating the pilot motor 20 to adjust rheostats 3 and 4 to reduce resistance in the dynamic braking circuit and effect an increase in braking current, hence an increase in degree of brake application, in effort to reestablish equilibrium in relay 15 between its spring and coils to maintain the degree of brake application commensurate with that desired as dictated by straight air pipe pressure. Once such increase in dynamic braking current at reducing rotational speeds of the traction motor armatures again reaches a value sufficient to reestablish equilibrium of the relay 15, spring 37 moves contact arm 27 to its intermediate position to stop operation of the pilot motor 20 and thereby further adjustment of the rheostats 3 and 4 until subsequent unbalance between spring 37 and coils 14, 40 in relay 15 again results from continued deceleration of the traction motor armatures, under which condition the cycle just described automatically will repeat in effort to maintain a constant dynamic braking current, hence constant degree of dynamic brake application. Once successive adjustments of rheostats 3 and 4 results in cut out of all or substantially all rheostat resistance in the dynamic braking circuit, it will be appreciated that continued reduction in rotational speed of the traction motor armatures will result in a reduction in generated dynamic braking current since compensation by rheostat resistance reduction adjustments can no longer be made and the dynamic braking effort reduces, fades out, with continued vehicle deceleration and is no longer in accord with the degree of dynamic braking called for by straight air pipe pressure.

*Description pneumatic brake portion*

The pneumatic brake portion of the combined pneumatic and dynamic brake apparatus comprises the usual brake cylinder device 80, a plurality of which may be employed, which will respond to effect application of a braking force to wheels of the vehicle according to degree of pressure of fluid supplied thereto by means of the usual brake cylinder pipe 81. The usual relay valve device 82 is employed to effect the variations in pressure of fluid in the brake cylinder device 80 by regulation of supply of fluid under pressure from a reservoir 83 via a supply pipe 84 according to variations in pressure of fluid in a control pipe 85. The usual lockout magnet valve device 86 is employed to selectively connect or disconnect and vent the control pipe 85 to and from the straight air pipe 65. When the control pipe 85 is connected to the straight air pipe 65, the relay valve device 82 will respond to variations in straight air pipe pressure between its respective maximum and minimum values to establish variations in pressure in the brake cylinder device 80 between corresponding maximum and minimum values, respectively. When the control pipe 85 is vented via lockout magnet valve device 86, the relay valve device 82 will correspondingly vent the brake cylinder device 80 via pipe 81.

The lockout magnet valve device 86, for sake of illustration, comprises a valve portion having a supply chamber 90 connected to the straight air pipe 65, and an exhaust chamber 92 connected to atmosphere via a port 93. Supply and release valves 94 and 95 are provided for controlling communication between a delivery chamber 91 connected to pipe 85 and chambers 90, 92, respectively. The valves 94 and 95 are attached to respective fluted stems 96 which extend through respective openings in respective partitions formed in the casing. The fluted stems 96 meet in chamber 91 and are so proportioned relative to distance between two respective valve seats encircling the partition openings that one of the valves 94, 95 is held unseated by seating of the other. A bias spring 100, disposed in chamber 92, is arranged to urge valves 94, 95 toward unseated and seated positions, respectively. The valve 94 is operatively connected to the magnet portion (shown in outline) of the valve device 86 by means of an attached stem 101. Upon energization of the magnet portion, through the medium of stem 101, the action of spring 100 is overcome to seat valve 94 and unseat valve 95 to close off chamber 91, hence control pipe 85, from chamber 90, hence straight air pipe 65, and open said chamber 91 to chamber 92 and via port 93 to atmosphere. Deenergization of the magnet portion of device 86 results in seating and unseating valves 95, 94, respectively, by action of spring 100 to open chamber 91 and control pipe 85 to chamber 90 and straight air pipe 65 while closing off chamber 91 to chamber 92 and thereby to the atmosphere.

B+ supply to the lockout magnet valve device is conducted via a wire 110, a switch 111 comprised in the lockout relay 46, a wire 112, a switch 113 operated by movement of the movable contact arms 7 and 9 of rheostats 3 and 4, as will be described in detail hereinafter, and a branch of the wire 30 connected to the positive terminal of the battery 26. The opposite terminal of the magnet portion of lockout magnet valve device 86 is grounded for return to the grounded negative terminal of battery 26 when switches 111 and 113 are closed to complete electrical circuit through the device.

The relay device 46 comprises a bias in the form of a tension spring 114, for example, which urges the switch 111 toward an open position in which it is shown in the drawing. The switch 111 has an operable connection, indicated by a dash line 115 in the drawing, with two magnet coils 116 and 45 which are arranged to generate additive magnetic efforts on switch 111 in opposition to action of spring 114. As aforedescribed, current for energizing the coil 45 is generated by the traction motors 1 and 2, being tapped off across the field coils of motors 2 and conveyed to said coil via the same rheostat 43 that regulates current to coil 40 in limit relay device 15. Coil 116 is connected in a circuit connected across a portion of the rheostat 4 my means of such as wires 117 and 118 so that the current flowing through said coil will be directly proportional to the dynamic braking current developed, hence to the degree of dynamic braking attained by the traction motors acting as generators.

The switch 113 comprises a bias, in the form of a compression spring 120, which is arranged to urge the switch 113 toward a closed position in which it is shown in the drawing. According to a feature of the invention, an actuating element 121 is attached to and carried by such as arm 7 of rheostat 3 for movement with the movable arms 7, 9 of both rheostats 3 and 4. The actuating element 121 is so proportioned and arranged, relative to travel of contact arms 7 and 9, that when these arms, travelling in a direction to reduce amount of rheostat resistance in the dynamic braking circuit in attempt to maintain dynamic braking current and effort as will be understood from previous description, the actuating element 121 will be carried into contact with switch 113 to open same in opposition to action of spring 120 at a point in travel of these arms 7, 9 just prior to their limit position in which all of the rheostat resistance is cut out or otherwise reduced to a minimum in the dynamic braking circuit, hence just prior to the "fade out point" of dynamic braking, for reasons which will become obvious from subsequent description.

*Operation of pneumatic portion of combined brake apparatus*

Assume normal operation of the dynamic brake, with the vehicle travelling at a speed sufficient to cause generation of dynamic braking current up to its full range and therefore above the fade out point of dynamic braking. Assume the operator's brake valve handle 70 to be in a brake application position calling for some desired degree of dynamic braking. Pressure of fluid in the straight air pipe 65, hence position of actuator 54, and hence adjusted position of rheostat 43 will all correspond to such position of the brake valve handle 70.

The lockout relay coil 45, being energized via rheostat 43 along with limit relay coil 40, will develop a magnetic force indicating the degree of dynamic brake called for, and the current flowing through lockout relay coil 116 will develop a magnetic force indicating the degree of dynamic brake developed. When the limit relay 15 and pilot motor 20 are functioning properly, by automatic adjustment of rheostats 3 and 4, the degree of dynamic braking will be in accord with that called for as will be appreciated from previous description, and the total magnetic force developed by the two coils 45, 116 of lockout relay 46 will hold switch 111 closed against opposition of spring 114.

At the same time, so long as the dynamic braking current is above the fade out point of dynamic braking, the actuating element 121 attached for movement with contact arms 7 and 9 of rheostats 3 and 4 will be out of contact with switch 113 which will be held in its closed position by action of spring 120.

With both switches 113 and 111 thus in their closed positions, the lockout magnet valve device 86 will be energized by current from battery 26 via wires 30, 112, 110 and said switches to vent control pipe 85 and render relay valve device 82 non-responsive to straight air pipe pressure to prevent operation of the pneumatic brakes at this time.

With normal operation of the limit relay 15 and pilot motor 20, and continued deceleration of the vehicle under influence of dynamic braking, just prior to the fade out point of the dynamic braking, movement of element 121 along with rheostat contact arms 7 and 9 will cause opening of switch 113 with consequent deenergization of lockout magnet valve device 86 to connect control pipe 85 to the straight air pipe 65 and allow relay valve device 82 to effect supply of fluid from reservoir 83 to brake cylinder 80 in degree in accord with straight air pipe pressure. Such supply of fluid under pressure to brake cylinder 80 just prior to the fade out point of the dynamic brake, will allow the pneumatic brake to build up substantially at the same rate as the dynamic brake fades under influence of continued deceleration of the vehicle at a constant total combined braking effort of both dynamic and pneumatic.

Below the fade out point of the dynamic brake, once the lockout magnet valve device 86 has been deenergized and the pneumatic brake consequently applied, the degree of such application may be controlled as desired through manipulation of the same brake valve handle 70 employed to control degree of dynamic brake application. Resultant variations in pressure of fluid in the straight air pipe 65 being communicated to the relay valve device 82 via the deenergized lockout magnet valve device will result in corresponding variations in pressure of fluid in brake cylinder 80.

Now assume again that the dynamic brake is in operation above its fade out point and is developing a dynamic braking current, hence braking effort in accord with that degree of dynamic brake application called for by pressure of fluid in straight air pipe 65 and indicated by position of rheostat 43 and current flowing through coils 40 and 45 of relay 15 and 46. From previous description it will be appreciated that both switches 113 and 111 will be in their closed positions with the lockout magnet valve device 86 energized and the pneumatic brake consequently released.

Now, according to a feature of the invention, if for any reason the dynamic brake should fail, due to such as failure of pilot motor 20 to adjust rheostats 3 and 4 for example, the lockout relay 46 will respond to consequent reduction in dynamic braking current flowing through its coils 45, 116 to open its switch 111 for deenergizing lockout magnet valve device 86 and effecting the desired brake application pneumatically once the degree of dynamic braking current, hence dynamic braking effort, drops off substantially to some such value as sixty per cent of any degree of dynamic braking called for by straight air pipe pressure.

Such protective action of the relay 46 to effect a pneumatic brake application upon sixty percent failure of dynamic brake application regardless of the original degree of such dynamic brake application occurs by virtue of the manner in which the two coils of relay 46 are employed in cooperative association with the dynamic brake controls comprising relay 15 and pilot motor 20.

Prior to failure of the dynamic brake and during normal operation of the pilot motor 20, a given position of rheostat 43 as dictated by pressure in straight air pipe 65 will result in development and maintenance of a particular dynamic braking current and effort by virtue of action of the two coil relay 15 and pilot motor 20 on the dynamic brake controlling rheostats 3 and 4. Such dynamic braking current thus, during normal operation, will be caused to vary substantially in direct proportion to pressure of fluid in the straight air pipe hence will be commensurate with the degree of brake desired, and the current flowing through coil 116 of relay 46 will be in direct proportion to dynamic braking current developed. By virtue of the design of rheostat 43 and actuator 54, the resistance imposed to the portion of dynamic braking current flowing through the coil 45 of relay 46 is such that such current will vary substantially inversely to the dynamic braking current and effort called for. With, during normal operation of the dynamic braking apparatus, the current flowing through coil 116 in relay 46 varying in direct proportion to the degree of dynamic braking current and effort called for and the current flowing through coil 45 of the same relay varying in inverse proportion to the dynamic brake current and effort called for, the total magnetic effort developed by the two coils acting together will be the same for all degrees of dynamic braking currents. Any reduction in dynamic braking current resulting from failure of the equipment, therefore, results in a reduction in total magnetic effort of the lockout relay coils 45, 116 from a previous total which is constant regardless of degree of dynamic braking originally in effect, and when such total magnetic effort reduces a certain constant proportion, such as sixty percent, of its original value, such effort can no longer overcome action of spring 114 which then opens switch 111 to cause a pneumatic brake application. The rate of reduction of total magnetic effort of the two coils 45, 116 of relay 46 corresponds substantially to the rate of undesired reduction in dynamic braking current, so that the loss of sixty percent total magnetic effort for causing a pneumatic brake application corresponds substantially to a loss of the same percentage in the dynamic braking current, hence dynamic braking effort, originally generated.

The percent loss of dynamic braking to which the relay 46 will respond to effect a pneumatic brake application is arbitrary and based on consideration of the effect that introduction of pneumatic braking on top of the failing dynamic braking will have on the total braking effort as experienced by the vehicle. Such percent loss may be changed expeditiously as desired by a change in bias of spring 114 acting on switch 111, for example.

Once the pneumatic brake thus has been brought into play, same may be employed to supplement or take the place of the dynamic brake, depending upon the degree of failure of the latter, and the pneumatic brake application may then be controlled through manipulation of the brake valve handle 70, as will be appreciated from previous description.

Upon rectification of cause of failure in dynamic braking, the combined pneumatic and dynamic brake apparatus will function as previously described, with the dynamic brake under control of the brake valve 53 and the pneumatic brake automatically taking over at the fade out point of the dynamic brake to assure a constant braking effort as the vehicle is brought to a stop.

*Summary*

It will now be seen that according to the invention, I have provided a combined pneumatic and dynamic brake apparatus which will respond to variations in straight air pipe pressure to effect application and maintenance of the dynamic brake in degree in accord with said pressure until the fade out point of the dynamic brake at reduced vehicle speed is reached, at which time the pneumatic brake automatically is applied also in degree in accord with straight air pipe pressure to bring the vehicle to a stop. The combined pneumatic and dynamic brake apparatus further comprises means which will respond to an unintentional reduction in dynamic brake application of a certain percentage from any original degree of application to effect application of the pneumatic brake to maintain the intended braking of the vehicle.

Having now described my invention, what I claim as new and desire to secure by Letters Patent, is:

1. A brake system for a vehicle comprising in combination, dynamic brake means generating a dynamic braking current proportional to the degree of dynamic braking attained, a fluid pressure brake control pipe, fluid pressure brake means responsive to control pressure of fluid in said control pipe to effect a fluid pressure brake application in degree corresponding to degree of said control pressure, a straight air pipe, an operator's control valve device operable to establish a degree of pressure in said straight air pipe according to degree of vehicle braking desired, magnet valve means energizable and deenergizable to connect said control pipe selectively either to atmosphere or to said straight air pipe, respectively, a source of electrical energy independent of said dynamic brake means, relay means comprising switch means actuable to open and closed positions to connect and disconnect said magnet valve means to and from said source of electrical energy, respectively, comprising bias means urging said switch means toward its open position, and comprising two relay coils electrically connected for energization by dynamic braking current and operatively connected to said switch means to oppose action of said bias means, and rheostat means responsive to pressure of fluid in said straight air pipe to impose electrical resistance to flow of dynamic braking current through one of said two relay coils in amount according to degree of said pressure.

2. The combination as set forth in claim 1, including means responsive to current flowing through said rheostat means to regulate generation of dynamic braking current for maintaining degree of dynamic brake application commensurate with degree of pressure of fluid in said straight air pipe.

3. A brake system for a vehicle comprising in combination, dynamic brake means including an armature driven by wheels of said vehicle and a series field in a dynamic braking circuit, a dynamic brake controlling rheostat including a contact element movable to and between a maximum resistance position and a minimum resistance position to vary amount of resistance in said dynamic braking circuit correspondingly, a fluid pressure brake control pipe, fluid pressure brake means responsive to control pressure of fluid in said control pipe to effect a fluid pressure vehicle brake application in degree corresponding to degree of said control pressure, a straight air pipe, an operator's control valve device operable to establish a degree of pressure in said straight air pipe according to degree of vehicle braking desired, magnet valve means energizable and deenergizable to connect said control pipe selectively either to atmosphere or to said straight air pipe, respectively, a source of electrical energy independent of said dynamic brake means, first and second switch means to control establishment and disestablishment of an electrical circuit between said source of electrical energy and said magnet valve means, first bias means urging said first switch means toward a closed position, second bias means urging said second switch means toward an open position, an actuating element associated with said contact element to open said first switch means against opposition of said first bias means as said contact element approaches its minimum resistance position, one pair of electro-magnet coils energized by dynamic braking current to develop a magnetic force acting on said second switch means in opposition to said second bias means, and control rheostat means responsive to pressure of fluid in said straight air pipe to impose electrical resistance to flow of dynamic braking current through one magnet coil of said one pair of magnet coils in amount corresponding to degree of said pressure.

4. The combination as set forth in claim 3, including reversible electric motor means operatively connected to said contact element to move same in a direction to decrease or increase resistance in said dynamic braking circuit according to selective energization of one or another field coil comprised in said motor, respectively, motor controlling switch means movable to opposite first and second positions to complete an electrical motor circuit between said source of electrical energy and said one or said other field coil, respectively, and movable to an intermediate position to interrupt said motor circuit, third bias means urging said motor controlling switch means toward its first position, and a second pair of electro-magnet coils energized by dynamic braking current to develop a magnetic force acting on said motor controlling switch means in opposition to said third bias means, one of said second pair of magnet coils being connected in series with said one magnet coil of said one pair of magnet coils to be subject to influence of said control rheostat.

CLAUDE M. HINES.

References Cited in the file of this patent
UNITED STATES PATENTS

| Number | Name | Date |
|---|---|---|
| 2,038,174 | Hewitt | Apr. 21, 1936 |
| 2,103,323 | Down | Dec. 28, 1937 |